US009736781B2

United States Patent
Poornachandran et al.

(10) Patent No.: US 9,736,781 B2
(45) Date of Patent: Aug. 15, 2017

(54) DETERMINING POINTS OF INTEREST WITHIN A GEOFENCE

(71) Applicant: INTEL CORPORATION, Santa Clara, CA (US)

(72) Inventors: Rajesh Poornachandran, Portland, OR (US); Rajasekaran Andiappan, Tampere (FI); Uttam K. Sengupta, Portland, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 13/627,881

(22) Filed: Sep. 26, 2012

(65) Prior Publication Data

US 2014/0089375 A1     Mar. 27, 2014

(51) Int. Cl.
| | |
|---|---|
| *G06F 15/16* | (2006.01) |
| *H04W 52/02* | (2009.01) |
| *G06F 1/32* | (2006.01) |
| *H04M 1/725* | (2006.01) |
| *H04W 4/02* | (2009.01) |

(52) U.S. Cl.
CPC ...... *H04W 52/0254* (2013.01); *G06F 1/3293* (2013.01); *H04M 1/72572* (2013.01); *H04W 4/023* (2013.01); *H04W 52/0274* (2013.01); *H04W 4/021* (2013.01); *H04W 4/027* (2013.01); *Y02B 60/121* (2013.01); *Y02B 60/50* (2013.01)

(58) Field of Classification Search
CPC ......... H04W 52/0254; H04W 52/0274; H04W 4/023; H04W 4/027; H04W 4/021; G06F 1/3293; H04M 1/72572; Y02B 60/50; Y02B 60/121
See application file for complete search history.

(56) References Cited

U.S. PATENT DOCUMENTS

| | | | | |
|---|---|---|---|---|
| 2008/0209011 | A1* | 8/2008 | Stremel et al. | ........ G06Q 20/20 |
| 2010/0185833 | A1* | 7/2010 | Saito et al. | ........... G06F 1/3203 |
| 2010/0323657 | A1* | 12/2010 | Barnard et al. | ......... H04W 4/02 |
| 2010/0332596 | A1* | 12/2010 | Perrella et al. | G06Q 10/063116 |

(Continued)

*Primary Examiner* — Chris Parry
*Assistant Examiner* — Soe M Hlaing
(74) *Attorney, Agent, or Firm* — Schwabe, Williamson & Wyatt, P.C.

(57) ABSTRACT

Embodiments of apparatus, packages, computer-implemented methods, systems, devices, and computer-readable media are described herein for a mobile computing device with a primary processing unit configured to operate in a normal mode and a reduced power mode. The mobile computing device may include a secondary processing unit, coupled with the primary processing unit, configured to provide, to a remote computing server, location data of the mobile computing device. The secondary processing unit may be configured to receive, from the remote computing server, one or more POIs contained within a geofence, identified based on the provided location data. The providing and receiving may be performed on behalf of the primary processing unit while the primary processing unit is in the reduced power mode. Operation of the secondary power processing unit may require less power than operation of the primary processing unit in the normal mode.

18 Claims, 5 Drawing Sheets

(56) References Cited

U.S. PATENT DOCUMENTS

| | | | |
|---|---|---|---|
| 2011/0055434 A1* | 3/2011 | Pyers | G06F 1/3203 |
| | | | 710/14 |
| 2012/0063577 A1* | 3/2012 | Foster | H04M 3/42374 |
| 2012/0158943 A1* | 6/2012 | Esteve Balducci et al. | H04L 12/5815 |
| 2013/0006522 A1* | 1/2013 | Vellaikal et al. | H04W 4/023 |
| 2013/0237254 A1* | 9/2013 | Papakipos | G06Q 10/10 |
| | | | 455/456.3 |
| 2013/0310053 A1* | 11/2013 | Srivastava et al. | G01S 5/02 |

* cited by examiner

DETERMINING POINTS OF INTEREST WITHIN A GEOFENCE

FIELD

Embodiments of the present invention relate generally to the technical field of data processing, and more particularly, to apparatuses and methods associated with determining points of interest within a geofence.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

A "geofence" is a virtual perimeter imposed on a geographic area. A fixed geofence may be defined, e.g., around a user's home, and the user's mobile device may be configured to take various actions (e.g., disengage a house alarm) upon entering the geofence. A dynamic geofence may be continuously defined around a mobile device such as a smart phone or tablet computer. Mobile devices may retrieve points of interest ("POI") geographically located within a dynamic geofence and provide those to the user. Continuous movement of the mobile device, such as might occur in a vehicle, may result in repeated geofence redefinition and POI retrieval, both which may drain the mobile device's power source. Moreover, a user may be overwhelmed with POIs when travelling through particular areas such as cities.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
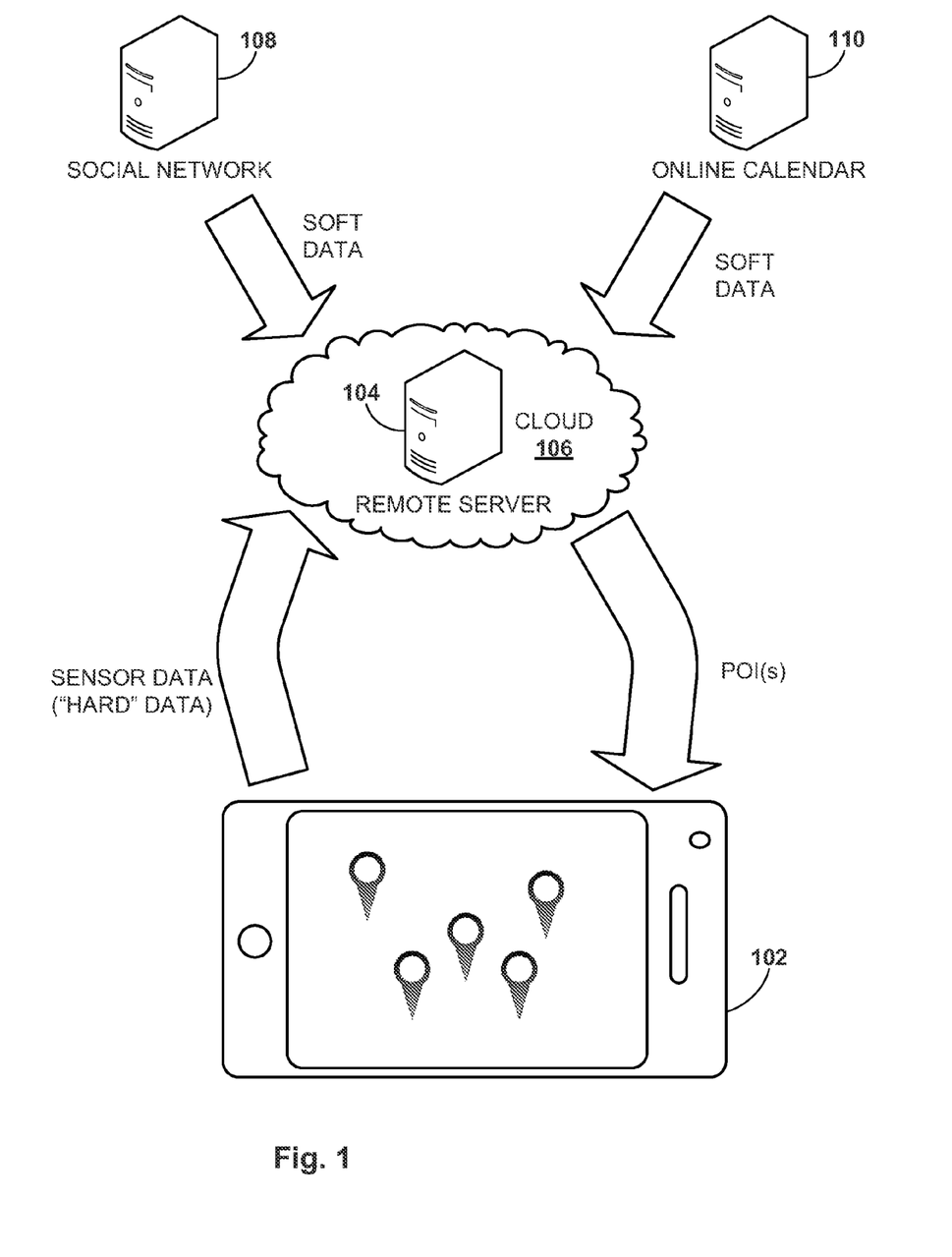
FIG. 1 schematically illustrates an example of how a mobile device configured with applicable portions of the teachings of the present disclosure may interact with various network resources to provide points of interest for consumption, in accordance with various embodiments of the present disclosure.

Referring now to FIG. 1, a mobile device 102 (configured with applicable portions of the teachings of the present disclosure) may be in network communication with a computing server 104. In various embodiments, computing server 104 may be implemented on one or more computing devices. In various embodiments, the one or more computing devices may form part of what may be referred to as a computing "cloud" 106. Although mobile device 102 is depicted as a touch screen smart phone, this is not meant to be limiting. As discussed below, mobile device 102 may be any type of data processing device, including but not limited to a tablet computer, a personal digital assistant ("PDA"), a laptop computer, a portable gaming device, and so forth.

As noted in the background, considerable computing resources (and hence, power) may be necessary for a mobile device such as mobile device 102 to retrieve and process points of interest ("POI") for presentation to a user. Accordingly, in various embodiments, identification and processing of POIs may be at least partially shifted to computing server 104 and/or a low power portion of mobile device 102, so that mobile device 102 may be awakened less often and consume less power.

As indicated by the arrow in FIG. 1, mobile device 102 may provide, to computing server 104, sensor data. "Sensor data" may include but is not limited to data gathered by sensors of mobile device 102 such as a global positioning system ("GPS") sensor (which may provide what is refereed to herein as "location" data), a proximity sensor, an accelerometer, a barometer, an ambient light sensor, a gyroscope, a magnetometer, a Geiger counter, and so forth. The data received by computing server 104 from these sensors may be referred to herein as "hard" data.

In addition to receiving the sensor data from mobile device 102, computing server may receive data from other sources. For instance, in various embodiments, computing server 104 may obtain data about a user of mobile device 102 from various network resources. These network resources may include but are not limited to social networking server 108, online calendars 110, and other network resources used by and/or affiliated with the user. The data received from these network resources may be referred to herein as "soft" data.

Computing server 104 may process the hard and soft data, in a process that may be referred to herein as "contextual aggregation," to identify and/or prioritize one or more POIs within a geofence defined based on the provided location data. For example, computing server 104 may infer a user's context (e.g., whether the user is driving, running, in a movie theatre, in a meeting, etc.) based on this hard and soft data. In various embodiments, computing server 104 may also predict a future context of the user, e.g., based on upcoming calendar appointments, travel plans, etc.). Performing the majority of this analysis at computing server 104, as opposed to, e.g., at mobile device 102, may reduce power usage by mobile device 102. Although as discussed herein, mobile device 102 in various embodiments may perform additional analysis of POIs it receives, more computationally intensive analysis may be left to computing server 104.

As one non-limiting example, computing server 104 may determine from barometric data received from mobile device 102 that it is raining at a location of mobile device 102. Based on this determination, and on a determination that the user soon has a meeting at which the user cannot appear disheveled or wet, computing server 104 may exclude outdoor POIs from the POIs it transmits to mobile device 102. As another example, computing server 104 may determine from received accelerometer data that mobile device 102 is moving in a particular direction. Based on this determination, computing server 104 may exclude, from the POIs it transmits to mobile device 102, POIs from which mobile device 102 is moving away.

Upon completion of the contextual aggregation, computing server 104 may transmit one or more POIs to mobile device 102, as indicated by the arrow in FIG. 1. In various embodiments, and as will be described in more detail below, mobile device 102 may receive these POIs while only partially awake. Without awaking fully, mobile device 102 may determine which received POIs, if any, satisfy one or more criteria. Upon a determination that one or more criteria are satisfied, mobile device 102 may more fully awaken in order to present the qualifying POIs to a user, e.g., on a touch screen display as shown in FIG. 1.

Figure 2:
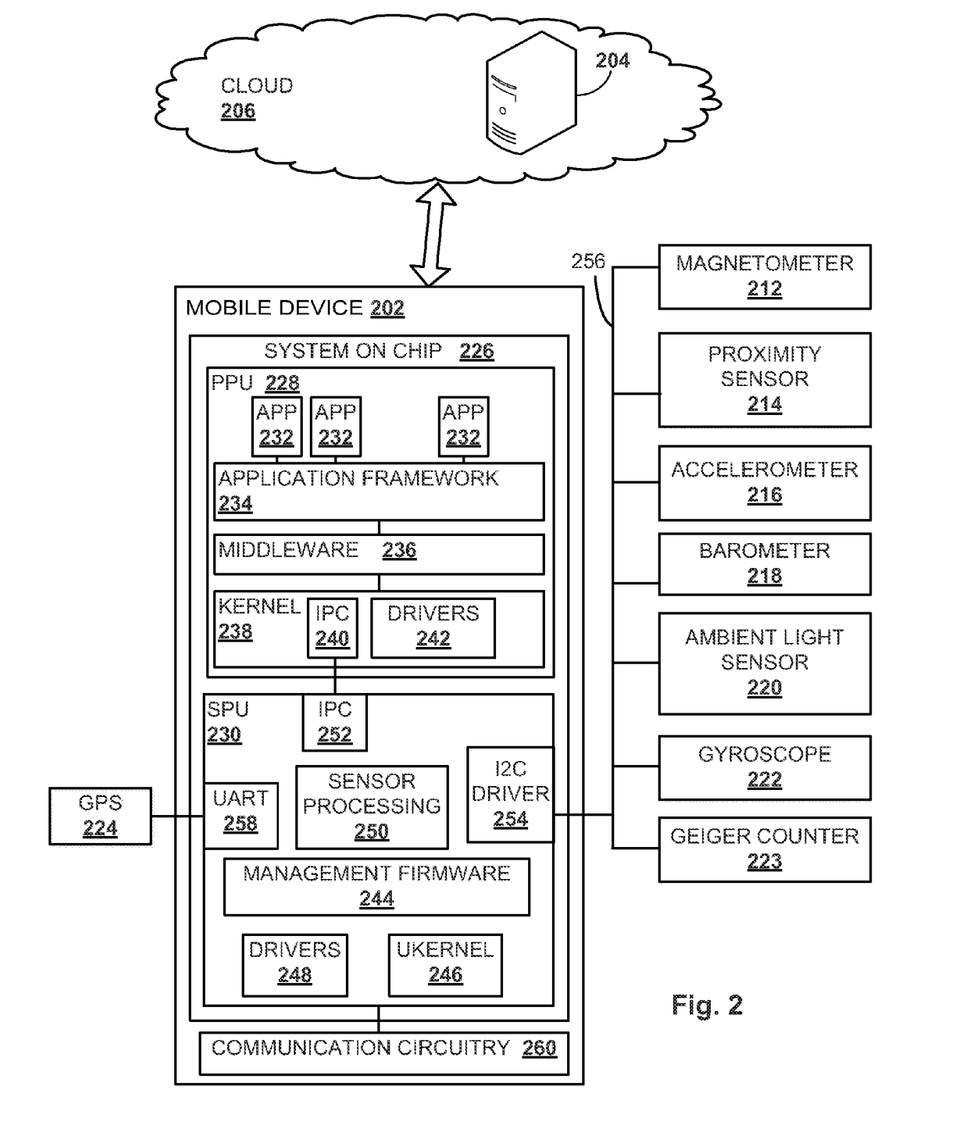
FIG. 2 schematically depicts an example mobile device configured with applicable portions of the teachings of the present disclosure, in accordance with various embodiments of the present disclosure.

FIG. 2 schematically depicts example components that may be found in a mobile device 202 configured with applicable portions of the teachings of the present disclosure, in accordance with various embodiments. These components are for illustration only, and it should be understood that other embodiments may include other components similar to or different than those shown in FIG. 2.

Mobile device 202 may be equipped with one or more sensors, including but not limited to a magnetometer 212, a proximity sensor 214, an accelerometer 216, a barometer 218, an ambient light sensor 220, a gyroscope 222, and/or a Geiger counter 223. Mobile device 202 may also be coupled with one or more location sensors, such as a GPS sensor 224.

In various embodiments, mobile device 202 may include a system on chip ("SoC") 226, although this is not required. In various embodiments, mobile device 202 may include (e.g., on SoC 226 or individually) a primary processing unit 228 (referred to as "PPU" in FIG. 2) and a secondary processing unit 230 (referred to as "SPU" in FIG. 2). In various embodiments, primary processing unit 228 may be constituted with a main core of a symmetric multiprocessing ("SMP") system, such as an ATOM core by the Intel® Corporation of Santa Clara, Calif. In various embodiments, one or more of primary processing unit 228 and secondary processing unit 230 may be configured for asymmetric multiprocessing ("ASMP").

In various embodiments, primary processing unit 228 may be configured to operate one or more applications 232. In various embodiments, the one or more applications 232 may be operated in accordance with an application framework 234, although this is not required. In various embodiments, primary processing unit 228 may also be configured to operate middleware 236, although this is not required. In various embodiments, primary processing unit 228 may also be configured to operate a kernel 238. Kernel 238 may operate an inter-processor communication ("IPC") logic 240 and one or more drivers 242.

In various embodiments, secondary processing unit 230 may be constituted with a platform service hub, such as those manufactured by the Intel® Corporation. In various embodiments, secondary processing unit 230 may be configured to provide a minimal execution environment independent of primary processing unit 228, and may be configured to have access to shared memory (not shown) of primary processing unit 228. In various embodiments, secondary processing unit 230 may be coupled with sensors 212-224, and may act as an intermediary between primary processing unit 228 and sensors 212-224.

In various embodiments, secondary processing unit 230 may include management firmware 244 that is executed to operate a microkernel 246 to control operations of secondary processing unit 230. In various embodiments, secondary processing unit 230 may include one or more of its own drivers 248. In various embodiments, secondary processing unit 230 may include a sensor processing logic 250 although this is not required.

In various embodiments, secondary processing unit 230 may include IPC logic 252 for communicating with corresponding IPC logic 240 of primary processing unit 228. In various embodiments, secondary processing unit 230 may include an inter-integrated circuit ("I2C") driver 254, e.g., to communicate with sensors (e.g., 212-223) operating on an I2C bus 256. In various embodiments, secondary processing unit 230 may include a universal asynchronous receiver/transmitter ("UART") 258, although this is not required. In some embodiments, UART 258 may interface secondary processing unit 230 with GPS sensor 224. In various embodiments, secondary processing unit 230 may also be operably coupled with communication circuitry 260 (e.g., one or more antennas, etc.). In various embodiments, secondary processing unit 230 may be configured to use communication circuitry 260 to communicate directly with remote computing server 204, e.g., without involvement by primary processing unit 228. For example, secondary processing unit 230 may be configured to "snoop" communications directed to mobile device 202 so that it may preprocess received POIs while primary processing unit 228 remains in a reduced power or sleep mode, and wake primary processing unit 228 where at least one of the POIs satisfies one or more criteria.

In various embodiments, and as mentioned above, primary processing unit 230 may be configured to operate in at least a selected one of a normal mode and a reduced power mode (e.g., "sleep" mode) that consumes less power than the normal mode. Primary processing unit 228 may spend most of its time in the reduced power mode, e.g., to preserve battery life. In various embodiments, primary processing unit 228 may be transitioned, e.g., by secondary processing unit 230, from the reduced power mode to the normal mode. Once in the normal mode, primary processing unit 228 may provide POIs to a user for consumption, e.g., visually, audibly and/or in a tactile manner, and may be able to accept user input.

In various embodiments, secondary processing unit 230 may be configured to provide, to a remote computing server 204 (which may correspond to computing server 104 of FIG. 1), location data of mobile device 202. In various embodiments, secondary processing unit 230 may do so independently of primary processing unit 228, allowing primary processing unit 228 to remain "asleep," thereby conserving power. In various embodiments, operation of secondary processing unit 230 may require less power than operation of primary processing unit 228 when it operates in its normal mode. For example, secondary processing unit 230 may receive, e.g., through UART 258 from GPS sensor 224, geographic coordinates. Secondary processing unit 230 may provide these coordinates to remote computing server 204, e.g., via communication circuitry 260, all without involvement by primary processing unit 228. In various embodiments, secondary processing unit 230 may also provide, to remote computing server 204, data sensed by one or more other sensors (e.g., 212-223).

In various embodiments, remote computing server 204 may pare down a list of potential POIs to be sent to mobile device 202, e.g., through the process of context aggregation. For example, computing server 204 may identify an initial list of potential POIs within a geofence defined by location data received from mobile device 202. Computing server 204 may then utilize the additional sensor data during contextual aggregation to select one or more POIs to be sent to mobile device 202. For instance, data received by remote computing server 204 from barometer 218 may indicate that it is likely to rain where mobile device 202 is located. In such case, remote computing server 204 may eliminate from a list of potential POIs those that are located outdoors.

In various embodiments, the one or more POIs selected by remote computing server 204 may be further based at least in part on soft information about a user obtained from one or more network resources accessible to remote computing server 204. For instance, remote computing server 204 may query a social networking server (e.g., 108 in FIG. 1) or an online calendar (e.g., 110 in FIG. 1) associated with the user for various soft information. Using this soft information, in conjunction with other data (e.g., location data, other sensor data), remote computing server 204 may select one or more POIs for transmission to mobile device 202. POIs are not limited to businesses or addresses of interest. For instance, in various embodiments, a POI may be a location of a contact of a user, as may be identified using, e.g., social network 108. In various embodiments, the contact's location may be a current GPS coordinate of one or more mobile devices associated with the contact, a home or work address of the contact, a current location of the contact as identified on a social network (e.g., via a status update), and so forth.

In various embodiments, secondary processing unit 230 may be configured to receive, from remote computing server 204, the pared down list of one or more POIs contained within a current geofence. In various embodiments, secondary processing unit 230 may receive the POIs from remote computing server 204 on behalf of primary processing unit 228, e.g., while primary processing unit 228 is in the reduced power mode.

In various embodiments, secondary processing unit 230 may cause primary processing unit 228 to transition from a reduced power mode to a normal mode responsive to a determination that one or more POIs received from remote computing server 204 satisfies one or more criteria. For example, secondary processing unit 230 may process one or more received POIs against various criteria to determine whether any of the POIs are worth waking primary processing unit 228. If awoken, primary processing unit 228 may notify a user of mobile device 202 of the POI(s), e.g., via visual, audible or tactile feedback. Criteria that may be evaluated, e.g., by secondary processing unit 230, to determine whether a POI is worthy of awakening primary processing unit 228 include but are not limited to policy settings, empirical data about past interest in similar POIs by the user and/or by others, and so forth.

Figure 3:
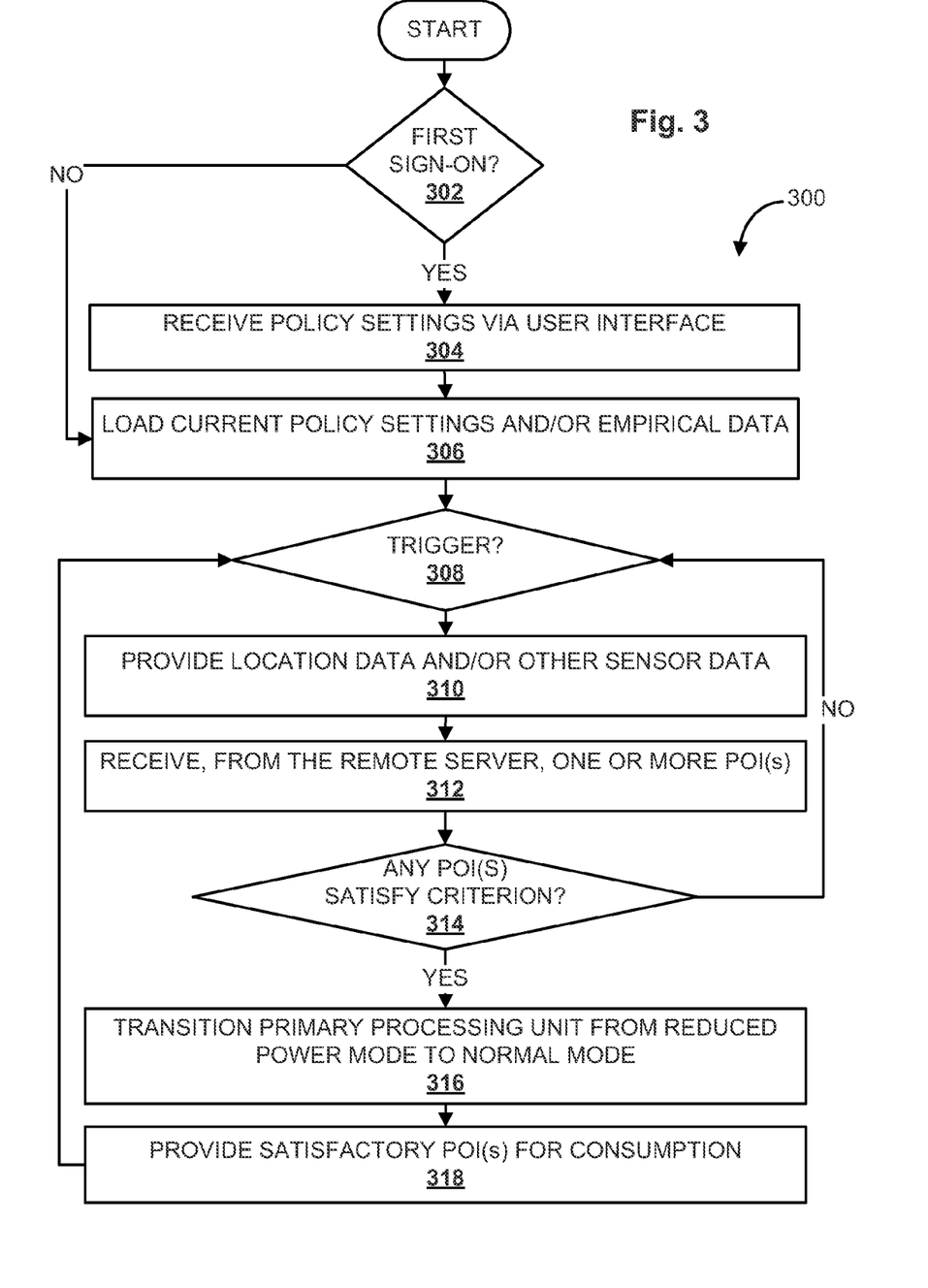
FIG. 3 schematically depicts an example method that may be implemented by a mobile device, in accordance with various embodiments of the present disclosure.

FIG. 3 depicts an example method 300 that may be implemented by a mobile device such as mobile device 102 or mobile device 202. Method 300 may start when invoked at the mobile device (e.g., in response to a user command or at startup), or in response to a command push from a computing server (e.g., 104, 204). At block 302, it may be determined whether this is the user's first time signing into a POI—providing service, e.g., provided by computing server 104 or 204. If the answer is yes, then at block 304, one or more policy settings may be received, e.g., via a user interface provided on a touch screen display of the mobile device.

Policy settings may include a wide variety of information. For instance, policy settings may include one or more criteria that a POI must satisfy in order to be presented to a user. In various embodiments, a policy setting may indicate whether a user wishes or does not wish to be informed about particular POIs, or types of POIs, or that the user only wishes to be informed of POIs at various intervals or under various circumstances (e.g., when the mobile device moves more than a threshold distance or speed). In various embodiments, policy settings may identify one or more network resources (e.g., social network server 108, online calendar 110) from which soft information may be obtained, e.g., for the computing server (e.g., 104, 204) to make decisions about which POIs to transmit to the mobile device.

In various embodiments, policy settings may identify one or more mobile devices to be associated with the user. In various embodiments, these mobile devices may be consulted, e.g., by remote computing server 104 or 204, to identify POIs to send to the user. In various embodiments, the user may update policy settings to identify specific POIs, such as a location of a contact of the user (e.g., a "friend" on a social network).

At block 306, current policy settings (e.g., received from the user at block 304) and/or empirical data may be loaded, e.g., by mobile device 102 or 202. For example, mobile device 202 may obtain empirical data about POI(s) the user has or has not been interested in previously, e.g., from computing server 204, social network server 108, memory (not shown) of mobile device 202, and so forth. Together, the policy settings and empirical data may define criteria that secondary processing unit 230 may use to determine whether POIs received from remote computing server 204 warrant awakening primary processing unit 228 to provide the POIs to the user for consumption.

Empirical data may include a variety of information. For example, empirical data may include past activities of the user. In various embodiments, past activities of a user may be evidenced by status updates by the user on a social networking account (e.g., 108 in FIG. 1), by past GPS readings, by past calendar appointments, and so forth. These past activities may reveal that the user in the past favored a particular type of restaurant, that the user visited a particular contact recently (and thus may be less likely to want to see the contact again), and so forth. Empirical data may also include past consumption of similar POIs, such as where a user indicated interest in a particular type of POI (e.g., by clicking on a pin rendered on a map for more information). Empirical data may include other data indicative of a user's interests, such as indications that a user has interest in something, as may be evidenced, e.g., by the user's "likes" via a social networking account.

Once policy settings and/or empirical data is loaded, at block 308, a triggering event may be awaited, e.g., by secondary processing unit 230 of mobile device 202. In various embodiments, one or more triggering events may be configured by a user, e.g., at block 306, may be configured by default, or may be configured based, e.g., on empirical data of past events that have caused the user or other users to seek out POIs. In various embodiments, triggering events may include but are not limited to a user-initiated command, the mobile device moving more than a predetermined distance, the mobile device moving faster than a predetermined velocity, the mobile device accelerating more than a predetermined amount, occurrence of a scheduled event (e.g., obtain restaurant-related POIs at noon when leaving work for lunch), and so forth. In some embodiments, non-triggering events may also cause method 300 to proceed to the next operation. For example, a mobile device may provide sensor data at predetermined time intervals.

Figure 4:
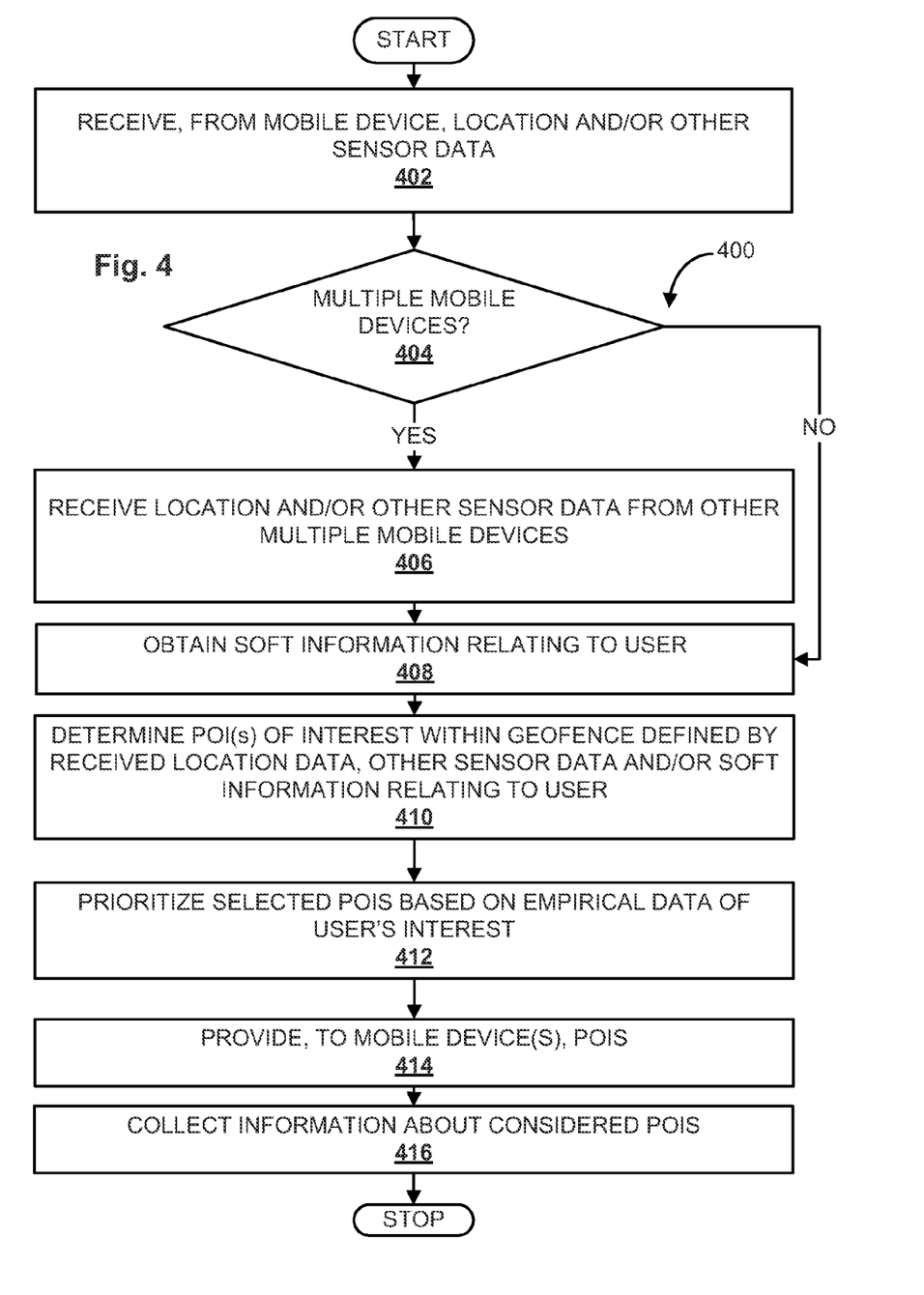
FIG. 4 schematically depicts an example method that may be implemented by a computing server to provide POIs within a geofence to a mobile device, in accordance with various embodiments.

Upon occurrence of the triggering (or non-triggering) event, at block 310, location data and/or other sensor data may be provided, e.g., by the mobile device (e.g., 102, 202) to the remote computing server (e.g., 104, 204). For example, mobile device 202 may provide, e.g., to remote computing server 204, a current GPS coordinate of mobile device 202, as well as other sensor data such as ambient light data, barometric data, accelerometer data, etc. As shown in FIG. 4, remote computing server 204 may utilize this location and other sensor data, in conjunction with other information such as soft information, to determine and/or prioritize POIs for transmission to mobile device 204.

At block 312, one or more POI(s) may be received, e.g., by a secondary processing unit (e.g., 230) of the mobile device (e.g., 102, 202), from the remote computing server. These POI(s) may already have been reduced, e.g., by the computing server using the method 400 of FIG. 4, from an original list of POIs that contained, for instance, all POIs within a geofence defined by the location data provided by the mobile device at block 310.

At block 314, it may be determined, e.g., by the secondary processing unit (e.g., 230) of the mobile device (e.g., 102, 202), whether any of the POI(s) received at block 312 satisfy one or more criteria defined by the policy settings and/or empirical data. If the answer is no, then method 300 may proceed back to block 308, to await another triggering event. However, if the answer is yes, then at block 316, the secondary processing unit (e.g., 230) of the mobile device (e.g., 102, 202) may cause the primary processing unit (e.g., 228) of the mobile device to transition from a reduced power mode to a normal mode.

Once the mobile device is more or fully awakened, at block 318, the one or more POI(s) that satisfied the criteria may be provided, e.g., by the primary processing unit (e.g., 228) of the mobile device, to the user for consumption. For example, the primary processing unit may cause a map to be rendered on a touch screen display of the mobile device, with one or more "pins" corresponding to the one or more POI(s) determined to be satisfactory at block 312. POIs may be presented to a user in a variety of other ways as well. For instance, in some embodiments, one or more POIs may be presented to the user as a sorted list, e.g., via a mobile web browser, or in a simple messaging service ("SMS") or multimedia messaging service ("MMS") message.

In various embodiments, one or more POIs may be provided, e.g., by remote computing server 204 or even by mobile device 202 itself, to another mobile device associated with the user, in addition to having been provided to mobile device 202. For example, assume hard data (e.g., from GPS sensor 224 and/or accelerometer 216) and/or soft information (e.g., the user's schedule, or future plans revealed on a social networking service) suggests that the user will be at a particular location at a particular time. In various embodiments, based on this information, remote computing server 204 may push one or more POIs to another mobile device of the user, e.g., one that may be located at the future location of the user. For instance, a user may be carrying a smart phone, but may have left a tablet computer at home. If the user is scheduled to be home at a future time (e.g., at 6 pm after work), a POI that might not be helpful to the user at the user's current location may be pushed to the tablet computer, so that the POI is available to the user for consumption upon the user's arrival home.

FIG. 4 depicts an example method 400 that may be implemented, e.g., by computing server 104 or 204, in accordance with various embodiments. At block 402, hard data may be received, e.g., by the computing server (e.g., 104 or 204) from a mobile device (e.g., 102 or 202). As noted above, hard data may include location and other data from sensors (e.g., 212-224).

At block 404, it may be determined, e.g., by the computing server (e.g., 104 or 204), whether there are other mobile devices associated with the user of the mobile device from which the hard data was received. For instance, remote computing server 204 may determine, e.g., from internal database records or other network resources, whether the user has associated multiple mobile devices with a single account. If the answer is yes, then at block 406, the remote computing server (e.g., 104, 204) may attempt to obtain and/or obtain, from the other identified mobile devices, hard data (e.g., location data and/or other sensor data).

Regardless of whether it is determined at block 404 that there are other mobile devices associated with the user, at block 408, soft information relating to the user may be obtained, e.g., by the remote computing server (e.g., 104, 204), from one or more network resources. For example, the remote computing server may retrieve information relating to the user from a social networking service of which the user is a member, or an online calendar associated with the user.

At block 410, one or more POIs may be determined, e.g., by the remote computing server (e.g., 104, 204), within the geofence defined by the location data received by the computing server at block 402. In various embodiments, this determination may be made based on one or more of the received location data, other sensor data received from the mobile device (e.g., 102, 202) or other mobile devices associated with the user of the mobile device, and/or soft information relating to the user. In various embodiments, at block 412, the determined POIs may be prioritized or otherwise sorted, e.g., by the computing server (e.g., 104, 204), based on policy settings provided by the user and/or empirical data about the user's historical interests.

At block 414, the one or more determined and/or prioritized POIs may be provided, e.g., by the remote computing server (e.g., 104, 204), to the mobile device (e.g., 102, 202). In various embodiments, geographic coordinates may be incorporated or otherwise included with the POIs, so that, e.g., the mobile device is able to render the POIs over a map.

In various embodiments, at block 416, the computing server (e.g., 104, 204) may collect information about the POI(s) that were considered by a secondary processing unit (e.g., 230) of a mobile device (e.g., 102, 202) to warrant awakening a primary processing unit (e.g., 228). This collected information may be added, e.g., by the remote computing server (e.g., 104, 204) to a database (not shown), which may be hosted in whole or part on the computing server, on the mobile device, or elsewhere.

In various embodiments, the remote computing server may also be configured to facilitate sharing of POI(s) among mobile devices and/or users. For example, assume a user's phone awakens to provide a POI to the user and that the user indicates interest in that POI (e.g., by clicking on a pin). In various embodiments, other mobile devices associated with the user or the user's contacts (determined, e.g., from social network 108) may be notified, e.g., by the computing server (e.g., 104, 204) or the mobile device (e.g., 102, 202) itself, of the user's interest in the POI.

Figure 5:
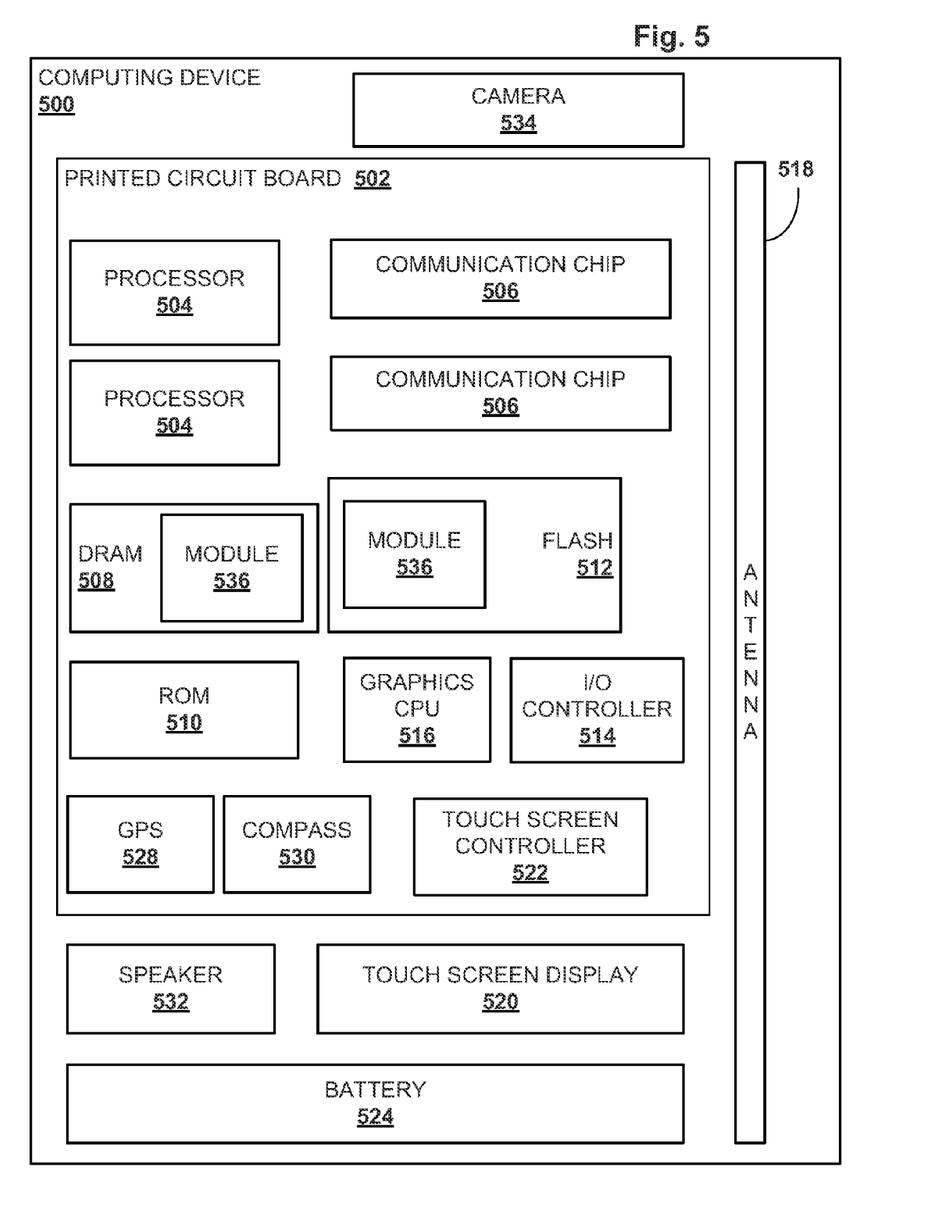
FIG. 5 schematically depicts an example computing device on which disclosed methods and computer-readable media may be implemented, in accordance with various embodiments.

FIG. 5 illustrates an example computing device 500, in accordance with various embodiments. A mobile device (e.g., 102, 202) or a remote computing server (e.g., 104, 204) as described herein may be implemented on a computing device such as computing device 500. Computing device 500 may include a number of components, one or more processor(s) 504 and at least one communication chip 506. In various embodiments, the one or more processor(s) 504 each may be a processor core. In various embodiments, the at least one communication chip 506 may also be physically and electrically coupled to the one or more processors 504. In further implementations, the communication chip 506 may be part of the one or more processors 504. In various embodiments, computing device 500 may include PCB 502. For these embodiments, the one or more processors 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory (e.g., dynamic random access memory 508, also referred to as "DRAM"), non-volatile memory (e.g., read only memory 510, also referred to as "ROM"), flash memory 512, an input/output controller 514, a digital signal processor (not shown), a crypto processor (not shown), a graphics processor 516, one or more antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, the processor 504 may be integrated on the same die with other components to form a System on Chip ("SoC").

In various embodiments, volatile memory (e.g., DRAM 508), non-volatile memory (e.g., ROM 510), flash memory 512, and the mass storage device may include programming instructions configured to enable computing device 500, in response to execution by one or more processors 504, to practice all or selected aspects of methods 300 or 400, depending on whether computing device 500 is used to implement mobile device 102/202 or remote computing server 104/204. For example, in the case of computing device 500 being used for mobile device 102/202, the instructions may be executed by two or more processors 504, forming a primary and a secondary processing unit as earlier described. In the case of computing device 500 being used for remote computing server 104/204, the instructions may be executed by as few as one processor 504. More specifically, one or more of the memory components such as volatile memory (e.g., DRAM 508), non-volatile memory (e.g., ROM 510), flash memory 512, and the mass storage device may include temporal and/or persistent copies of instructions that, when executed, by one or more processors 504, enable computing device 500 to operate one or more modules 536 configured to practice all or selected aspects of methods 300 or 400, depending on whether computing device 500 is used to implement mobile device 102/202 or remote computing server 104/204.

The communication chips 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Most of the embodiments described herein include WiFi and LTE RAT as examples. However, the communication chip 506 may implement any of a number of wireless standards or protocols, including but not limited to IEEE 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

Embodiments of apparatus, packages, computer-implemented methods, systems, devices, and computer-readable media (transitory and non-transitory) are described herein for a mobile computing device that may include a primary processing unit configured to operate in at least a selected one of a normal mode and a reduced power mode that consumes less power than the normal mode. In various embodiments, the mobile computing device may include a secondary processing unit, coupled with the primary processing unit, configured to provide, to a remote computing server, location data of the mobile computing device. In various embodiments, the secondary processing unit may be configured to receive, from the remote computing server, one or more POIs contained within a geofence, identified based on the provided location data. In various embodiments, the providing and receiving may be performed on behalf of the primary processing unit while the primary processing unit is in the reduced power mode. In various embodiments, operation of the secondary power processing unit may require less power than operation of the primary processing unit in the normal mode.

In various embodiments, the mobile computing device may include a location sensor, coupled with the secondary processing unit, configured to provide, to the secondary processing unit, the location data of the mobile computing device. In various embodiments, the secondary processing unit may be further configured to transition the primary processing unit from the reduced power mode to the normal mode responsive to a determination that the received one or more points of interest satisfies a criterion.

In various embodiments, the mobile device may include another sensor in the form of a proximity sensor, an accelerometer, a barometer, a gyroscope, a magnetometer, a Geiger counter and/or an ambient light sensor. In various embodiments, the secondary processing unit may be further configured to provide, to the remote computing server, data sensed by the another sensor, wherein the one or more points of interest received from the remote computing server are based at least in part on the data sensed by the another sensor.

In various embodiments, the one or more points of interest received from the remote computing server may be further based at least in part on soft information about a user obtained from one or more network resources accessible to the remote computing server. In various embodiments, the soft information about the user may include information obtained from a social network account of the user or an online calendar of the user. In various embodiments, the mobile computing device may include an antenna.

In various embodiments, a computing server (which may operate as part of a "cloud") may be configured to receive location data sensed by a mobile computing device. In various embodiments, the computing server may be configured to retrieve soft information about a user of the mobile computing device from a network resource accessible to the computing server. In various embodiments, the computing server may be configured to determine, based on the soft information, one or more points of interest within a geofence identified by the computing server based at least in part on the location data. In various embodiments, the computing server may be configured to provide, to the mobile computing device, the one or more points of interest.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A mobile computing device, comprising:
   a primary processing unit to operate in at least a selected one of a normal mode and a reduced power mode that consumes less power than the normal mode; and
   a secondary processing unit, coupled with the primary processing unit, to provide, to a remote computing server, location data of the mobile computing device and descriptions of network resources, and to receive, from the remote computing server, one or more points of interest contained within a geofence, identified based on the provided location data and soft information obtained by the remote computing server from the network resources, wherein the network resources include one or more social network servers or one or more calendars used by a user, wherein said provide and receive are performed by the secondary processing unit on behalf of the primary processing unit while the primary processing unit is in the reduced power mode, and wherein operation of the secondary processing unit requires less power than operation of the primary processing unit in the normal mode;
   wherein the secondary processing unit is to further determine whether the received one or more points of interest satisfy one or more criteria of one or more policies that govern whether a point of interest contained within the geofence is to be presented to the user of the mobile computing device, and transition the primary processing unit from the reduced power mode to the normal mode to present the one or more points of interest that satisfy the one or more criteria of the one or more policies responsive to a determination that at least one or more of the received one or more points of interest satisfy at least one of the one or more criteria of at least one of the policies; wherein the one or more policies that govern whether a point of interest contained within the geofence is to be presented includes at least a policy that specifies intervals or non-distance circumstances under which points of interest are to be presented.

2. The mobile computing device of claim 1, further comprising a location sensor coupled with the secondary processing unit to provide to the secondary processing unit the location data of the mobile computing device.

3. The mobile computing device of claim 1, further comprising another sensor coupled with the secondary processing unit, wherein the another sensor is a proximity sensor, an accelerometer, a barometer, a gyroscope, a magnetometer or an ambient light sensor.

4. The mobile computing device of claim 3, wherein the secondary processing unit is to further provide, to the remote computing server, data sensed by the another sensor, wherein the one or more points of interest received from the remote computing server are based at least in part on the data sensed by the another sensor.

5. The mobile computing device of claim 1, further comprising an antenna.

6. At least one non-transitory computer-readable medium comprising instructions that, in response to execution of the instructions by a computing server, cause the computing server to:
receive descriptions of network resources and location data sensed by a sensor of a mobile computing device and sent by a secondary processing unit of the mobile computing device while a primary processing unit of the mobile computing device is in a reduced power mode, wherein the location data is received based on a triggering event related to movement of the mobile computing device, wherein the network resources include one or more social network servers or one or more calendars used by a user;
retrieve soft information about the user of the mobile computing device from one of the network resources;
determine, based on the soft information, one or more points of interest within a geofence identified by the computing server based at least in part on the location data; and
provide, to the mobile computing device, the one or more points of interest;
wherein the secondary processing unit of the mobile computing device is to determine whether the provided one or more points of interest satisfy one or more criteria of one or more policies that govern whether a point of interest contained within the geofence is to be presented to the user of the mobile computing device, and transition the primary processing unit from the reduced power mode to a normal mode to present the one or more points of interest that satisfy the one or more criteria of the one or more policies responsive to a determination that at least one or more of the received one or more points of interest satisfy at least one of the one or more criteria of at least one of the policies, wherein the one or more policies that govern whether a point of interest contained within the geofence is to be presented includes at least a policy that specifies intervals or non-distance circumstances under which points of interest are to be presented.

7. The at least one non-transitory computer-readable medium of claim 6, wherein the instructions, in response to execution of the instructions by the computing server, cause the computing server to receive data indicative of ambient light sensed by the mobile computing device, and to determine the one or more points of interest based at least in part on the received data indicative of ambient light.

8. The at least one non-transitory computer-readable medium of claim 6, wherein the instructions, in response to execution of the instructions by the computing server, cause the computing server to receive barometric data sensed by the mobile computing device, and to determine the one or more points of interest based at least in part on the received barometric data.

9. The at least one non-transitory computer-readable medium of claim 6, wherein the instructions, in response to execution of the instructions by the computing server, cause the computing server to receive data sensed by an accelerometer or gyroscope of the mobile computing device, and to determine the one or more points of interest based at least in part on the received data sensed by the accelerometer or gyroscope of the mobile computing device.

10. The at least one non-transitory computer-readable medium of claim 6, wherein the instructions, in response to execution of the instructions by the computing server, cause the computing server to:
determine, based on the soft information, a contact of the user; and
provide, to the mobile computing device, a location of another mobile computing device associated with the contact as a point of interest, responsive to a determination that the another mobile computing device is within the geofence.

11. At least one non-transitory computer-readable medium comprising instructions that, in response to execution of the instructions by a secondary processing unit of a mobile computing device having primary and secondary processing units, cause the secondary processing unit to provide, to a remote computing server, location data of the mobile computing device and descriptions of network resources, and to receive, from the remote computing server, one or more points of interest contained within a geofence, identified based on the provided location data and soft information obtained by the remote computing server from the network resources, wherein the network resources include one or more social network servers or one or more calendars used by a user, wherein said provide and receive are performed by the secondary processing unit on behalf of the primary processing unit while the primary processing unit is in a reduced power mode in which the primary processor consumes less power than when in a normal mode, and wherein operation of the secondary processing unit requires less power than operation of the primary processing unit in the normal mode, and wherein the secondary processing unit is to further determine whether the received one or more points of interest satisfy one or more criteria of one or more policies that govern whether a point of interest contained within the geofence is to be presented to the user of the mobile computing device, and transition the primary processing unit from the reduced power mode to the normal mode to present the one or more points of interest that satisfy the one or more criteria of the one or more policies responsive to a determination that the received one or more points of interest satisfy at least one of the one or more criteria of at least one of the policies; wherein the one or more policies that govern whether a point of interest contained within the geofence is to be presented includes at least a policy that specifies intervals or non-distance circumstances under which points of interest are to be presented.

12. The at least one non-transitory computer-readable medium of claim 11, wherein the instructions, in response to execution of the instructions by the secondary processing unit, cause the secondary processing unit to receive, from a location sensor coupled with the secondary processing unit, the location data of the mobile computing device.

13. The at least one non-transitory computer-readable medium of claim 11, wherein the instructions, in response to execution of the instructions by the secondary processing unit, cause the secondary processing unit to receive data sensed by another sensor coupled with the secondary processing unit, wherein the another sensor is a proximity sensor, an accelerometer, a barometer, a gyroscope, a magnetometer or an ambient light sensor.

14. The at least one non-transitory computer-readable medium of claim 13, wherein the instructions, in response to execution of the instructions by the secondary processing unit, cause the secondary processing unit to provide, to the remote computing server, data sensed by the another sensor, wherein the one or more points of interest received from the remote computing server are based at least in part on the data sensed by the another sensor.

15. A computer-implemented method, comprising:
receiving, by a computing device, descriptions of network resources and location data sensed by a sensor of a mobile computing device and sent by a secondary processing unit of the mobile computing device while a primary processing unit of the mobile computing device is in a reduced power mode, wherein the receiving is based on a triggering event related to movement of the mobile computing device, wherein the network resources include one or more social network servers or one or more calendars used by a user;
receiving, by the computing device, other sensor data sensed by a mobile computing device;
retrieving, by the computing device, soft information about the user of the mobile computing device from one of the network resources;
determining, by the computing device, based on the soft information and other sensor data, one or more points of interest within a geofence identified by the computing device based at least in part on the location data; and
providing, to the mobile computing device, the one or more points of interest;
wherein the secondary processing unit of the mobile computing device is to determine whether the provided one or more points of interest satisfy one or more criteria of one or more policies that govern whether a point of interest contained within the geofence is to be presented to the user of the mobile computing device, and transition the primary processing unit from the reduced power mode to a normal mode to present the one or more points of interest that satisfy the one or more criteria of the one or more policies responsive to a determination that at least one or more of the received one or more points of interest satisfy at least one of the one or more criteria of at least one of the policies, wherein the one or more policies that govern whether a point of interest contained within the geofence is to be presented includes at least a policy that specifies intervals or non-distance circumstances under which points of interest are to be presented.

16. The computer-implemented method of claim 15, further comprising:
determining, by the computing device, based on the soft information, a contact of the user; and
providing, by the computing device, to the mobile computing device, a location of another mobile computing device associated with the contact as a point of interest, responsive to a determination that the another mobile computing device is within the geofence.

17. The computer-implemented method of claim 15, further comprising:
identifying, by the computing device, another mobile computing device associated with the user; and
retrieving, by the computing device from the identified another mobile computing device, location or other sensor data sensed by the identified another computing device.

18. The computer-implemented method of claim 17, wherein the determining comprises determining, by the computing device, based on the soft information and other sensor data sensed by the mobile computing device, and based on the location or other sensor data sensed by the identified another computing device, the one or more points of interest within a geofence identified by the computing device.

* * * * *